United States Patent
Gong et al.

(10) Patent No.: US 11,724,708 B2
(45) Date of Patent: Aug. 15, 2023

(54) FAIL-SAFE HANDLING SYSTEM FOR AUTONOMOUS DRIVING VEHICLE

(71) Applicants: Baidu USA LLC, Sunnyvale, CA (US); Baidu.com Times Technology (Beijing) Co., Ltd., Beijing (CN)

(72) Inventors: Guohao Gong, Beijing (CN); Fan Zhu, Sunnyvale, CA (US); Yue Wang, Beijing (CN); Xin Xu, Beijing (CN); Xiang Liu, Beijing (CN); Yongyi Sun, Beijing (CN); Yingnan Liu, Beijing (CN); Junping Wang, Beijing (CN); Jingjing Xue, Beijing (CN)

(73) Assignees: BAIDU USA LLC, Sunnyvale, CA (US); BAIDU.COM TIMES TECHNOLOGY (BEIJING) CO., LTD., Beijing (CN)

(*) Notice: Subject to any disclaimer, the term of this patent is extended or adjusted under 35 U.S.C. 154(b) by 0 days.

(21) Appl. No.: 16/960,843

(22) PCT Filed: Jun. 12, 2020

(86) PCT No.: PCT/CN2020/095970
§ 371 (c)(1),
(2) Date: Jul. 8, 2020

(87) PCT Pub. No.: WO2021/248499
PCT Pub. Date: Dec. 16, 2021

(65) Prior Publication Data
US 2021/0387631 A1    Dec. 16, 2021

(51) Int. Cl.
*B60W 50/023* (2012.01)
*B60W 60/00* (2020.01)
(Continued)

(52) U.S. Cl.
CPC .......... *B60W 50/023* (2013.01); *B60W 10/18* (2013.01); *B60W 30/06* (2013.01);
(Continued)

(58) Field of Classification Search
CPC .. B60W 50/023; B60W 60/001; B60W 10/18; B60W 30/06; B60W 50/0205; B60W 50/0225
See application file for complete search history.

(56) References Cited

U.S. PATENT DOCUMENTS 9,195,232 B1 * 11/2015 Egnor ................. G05D 1/0055
10,824,145 B1 * 11/2020 Konrardy ................ B60R 21/34
(Continued)

FOREIGN PATENT DOCUMENTS

CN    104503272 A    4/2015
CN    109895787 A    6/2019
(Continued)

*Primary Examiner* — Nicholas Kiswanto
*Assistant Examiner* — Jamal A Shah
(74) *Attorney, Agent, or Firm* — Womble Bond Dickinson (US) LLP

(57) ABSTRACT

According to various embodiment, described herein are methods and systems for reliably detecting malfunctions in a variety of software or hardware components in an autonomous driving vehicle (ADV). In one embodiment, a redundant system can be provided on an independent computing device in an ADV to check for malfunctions in a number of software or hardware components. When no malfunction occurs in the ADV, an autonomous driving system (ADS) in the ADV operates to drive the ADV, while the redundant system can monitor the ADS in a standby mode. In the event of a malfunction, the redundant system can take over the control of the ADV, and take appropriate actions based on a severity level of the malfunction.

20 Claims, 7 Drawing Sheets

(51) Int. Cl.
*B60W 10/18* (2012.01)
*B60W 30/06* (2006.01)
*B60W 50/02* (2012.01)

(52) U.S. Cl.
CPC .... *B60W 50/0205* (2013.01); *B60W 50/0225* (2013.01); *B60W 60/001* (2020.02)

(56) References Cited

U.S. PATENT DOCUMENTS 11,180,156 B2 * 11/2021 Lopez ................. B60W 50/038
2021/0253116 A1 * 8/2021 Ben-Ezra .......... B60W 50/0225

FOREIGN PATENT DOCUMENTS

| CN | 110682876 A | 1/2020 |
| CN | 110737192 A | 1/2020 |
| JP | 2007280313 A | 10/2007 |
| KR | 20070040089 A | 4/2007 |

\* cited by examiner

FAIL-SAFE HANDLING SYSTEM FOR AUTONOMOUS DRIVING VEHICLE

TECHNICAL FIELD

Embodiments of the present disclosure relate generally to operating autonomous driving vehicles. More particularly, embodiments of the disclosure relate to a fail-safe system in an autonomous driving vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Safety is critical in an autonomous driving vehicle (ADV) since it is designed to be driven with minimum human intervention. However, it is hard to prevent malfunctions from occurring in an ADV, since an ADV is a complicated system that is composed of various sensors, computers, actuators and other types of equipment as well as various software components to mimic the actions of a human driver in operating the vehicle.

Typically, a fail-safe system is provided in an ADV to mitigate the impact of a malfunction when it does occur. Existing fail-safe systems, however, either do not check every component that may malfunction, or cannot reliably detect a malfunction when it does occur.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
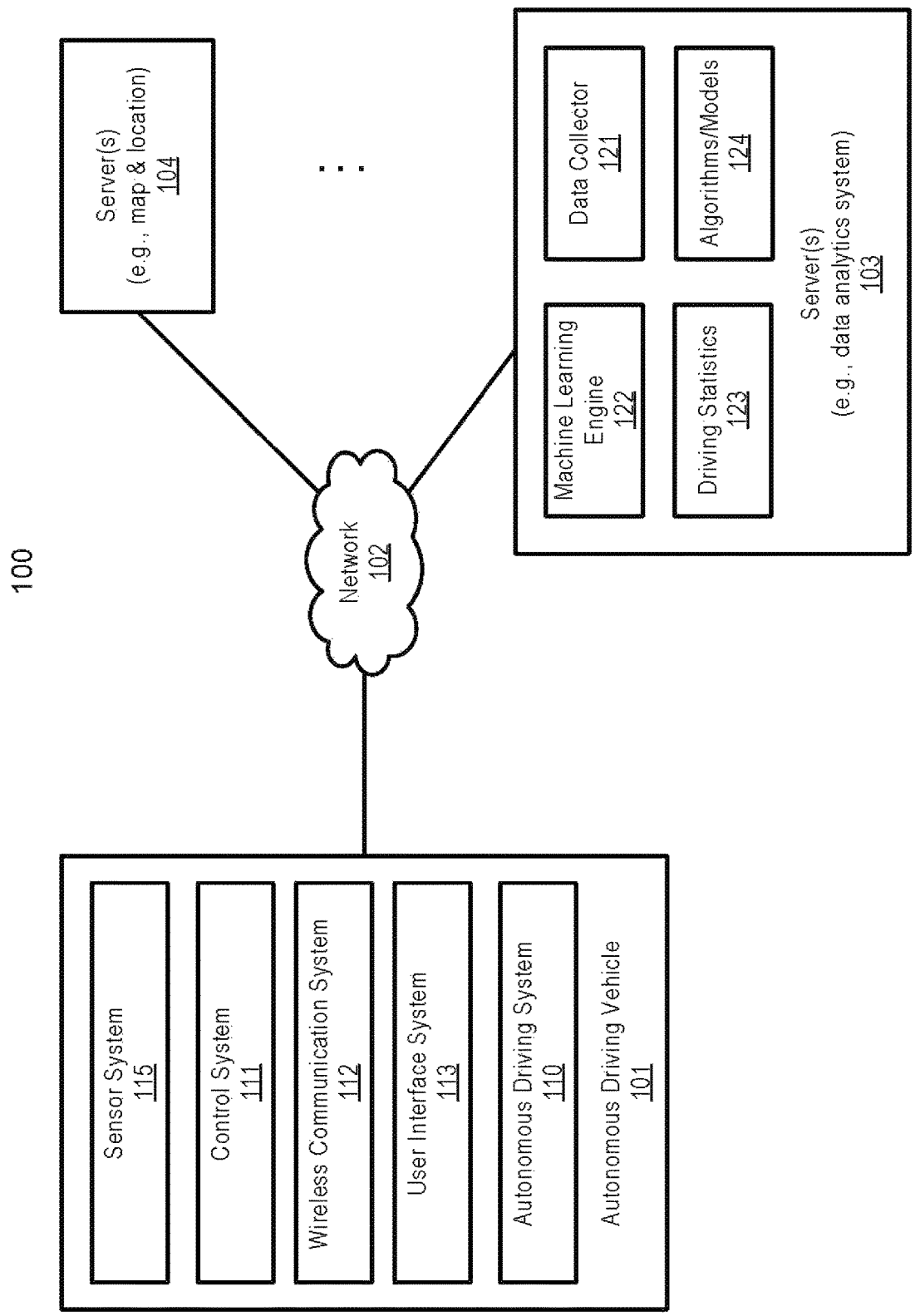
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to various embodiment, described herein are methods and systems for reliably detecting malfunctions in a variety of software or hardware components in an autonomous driving vehicle (ADV). In one embodiment, a redundant system can be provided on an independent computing device in an ADV to check for malfunctions in a number of software or hardware components. When no malfunction occurs in the ADV, an autonomous driving system (ADS) in the ADV operates to drive the ADV, while the redundant system can monitor the ADS in a standby mode. In the event of a malfunction, the redundant system can take over the control of the ADV, and take appropriate actions based on a severity level of the malfunction.

In one embodiment, a method of handling malfunctions in an ADV can include the operations of receiving, at a redundant system running on a first piece of hardware, a real-time parameter from each of a number of components in the ADV, which is driving in an autonomous driving mode using an autonomous driving system (ADS) that runs on a second piece of hardware; and determining, by the redundant system, that a malfunction has occurred in the component based on a comparison between the real-time value and an expected value of the parameter. The method further includes the operations of determining a level of failure risk for the malfunction based on a predetermined algorithm; and issuing, by the redundant system, one or more driving commands directly to a controller area network (CAN bus) in the ADV to control the ADV in response to the level of failure risk of the malfunction.

In one embodiment, the real-time parameter is one of an output data channel frequency, central process unit (CPU) utilization, memory utilization, disk space, a data processing delay, or a total link delay timeout.

In one embodiment, there can be three levels of failure risk: high, medium, or low. For the high level of failure risk, the redundant system can issue driving commands to an emergency parking, whereas for the medium or low level of failure risk, the redundant system can issue command to perform a slow braking to drive the ADV to a closest safe place to park.

In one embodiment, in driving the ADV in the event of a malfunction, the redundant system relies on sensor data and localization information, and sends driving commands directly to the CAN bus without using the autonomous driving functionality or control functionality that are used to driving the ADV when no malfunction is detected.

Autonomous Driving Vehicle

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, control system 111, wireless communication system 112, user interface system 113, and sensor system 115. ADV 101 may further include certain common components included in ordinary vehicles, such as, an engine, wheels, steering wheel, transmission, etc., which may be controlled by control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
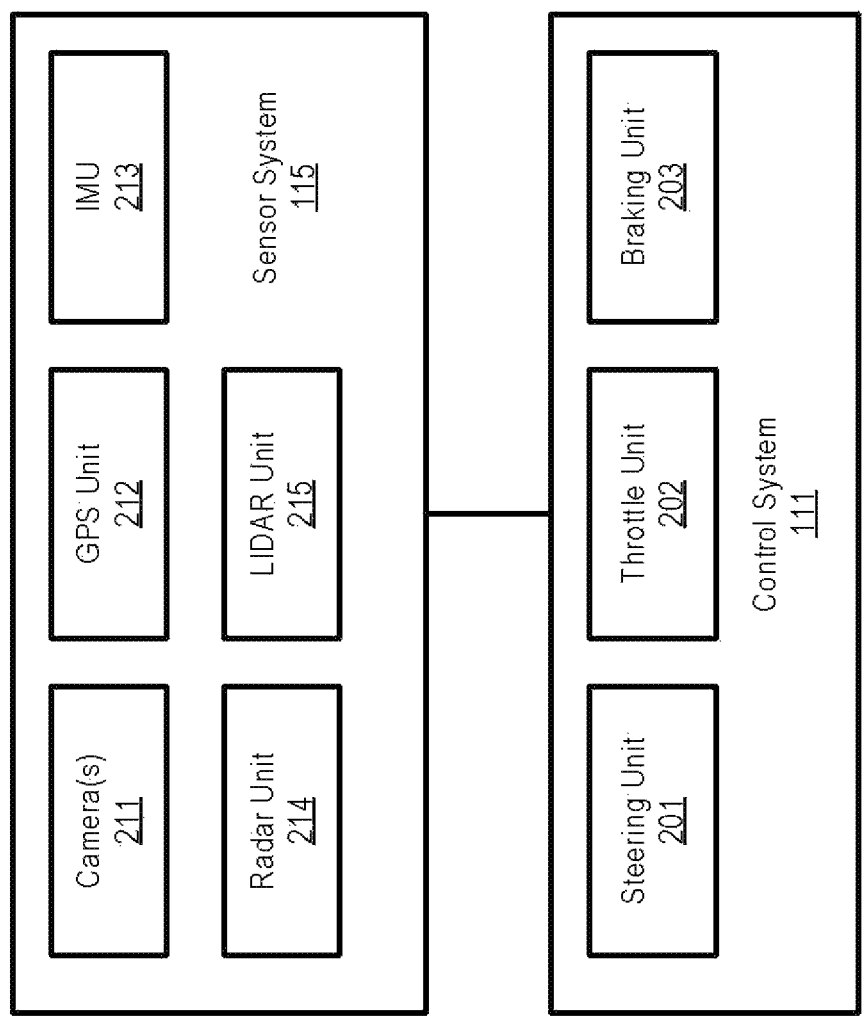
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. Algorithms 124 can then be uploaded on ADVs to be utilized during autonomous driving in real-time.

Figure 3A:
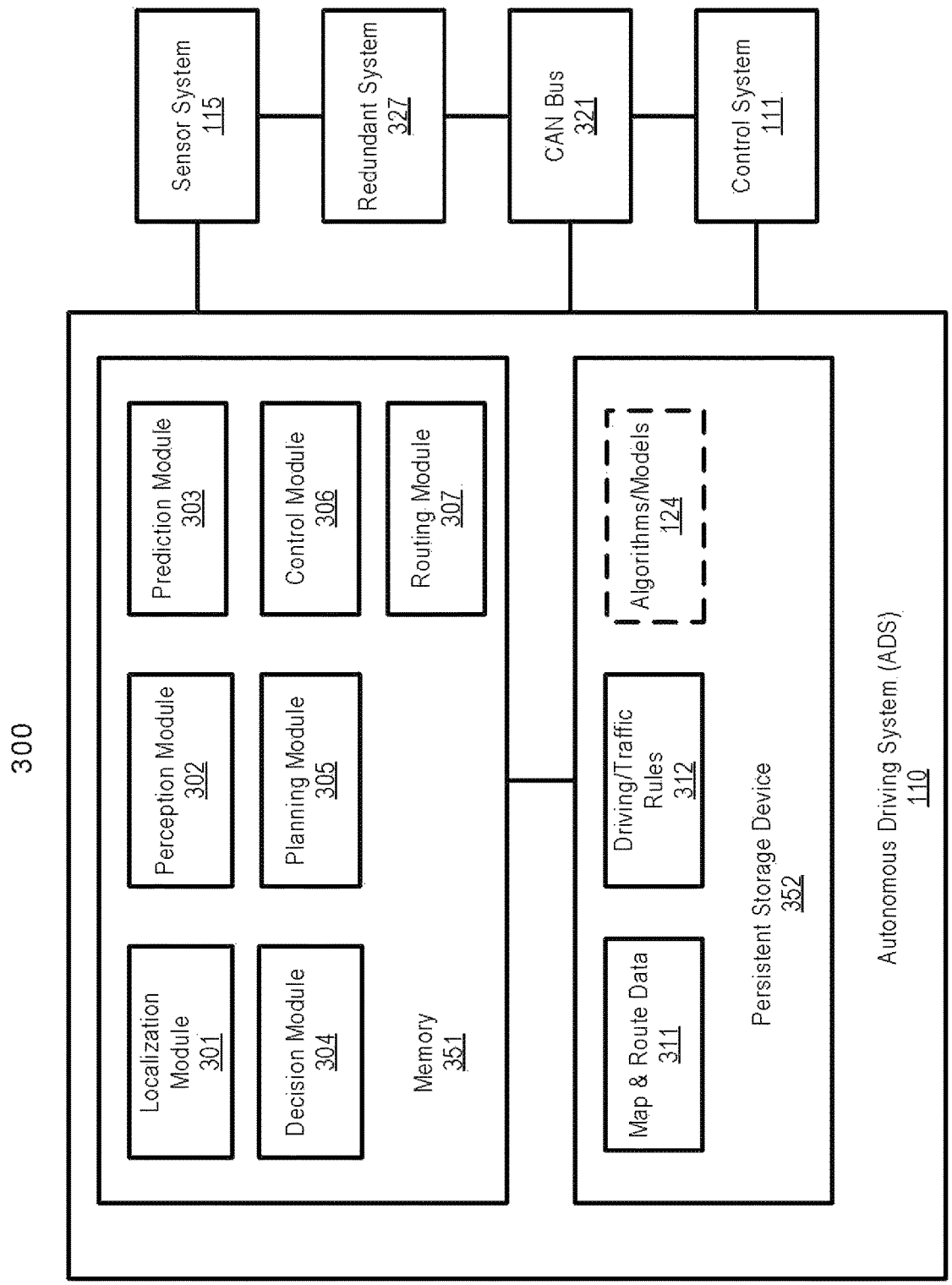
FIGS. 3A-3B are block diagrams illustrating an example of an autonomous driving system used with an autonomous driving vehicle according to one embodiment.
Figure 3B:
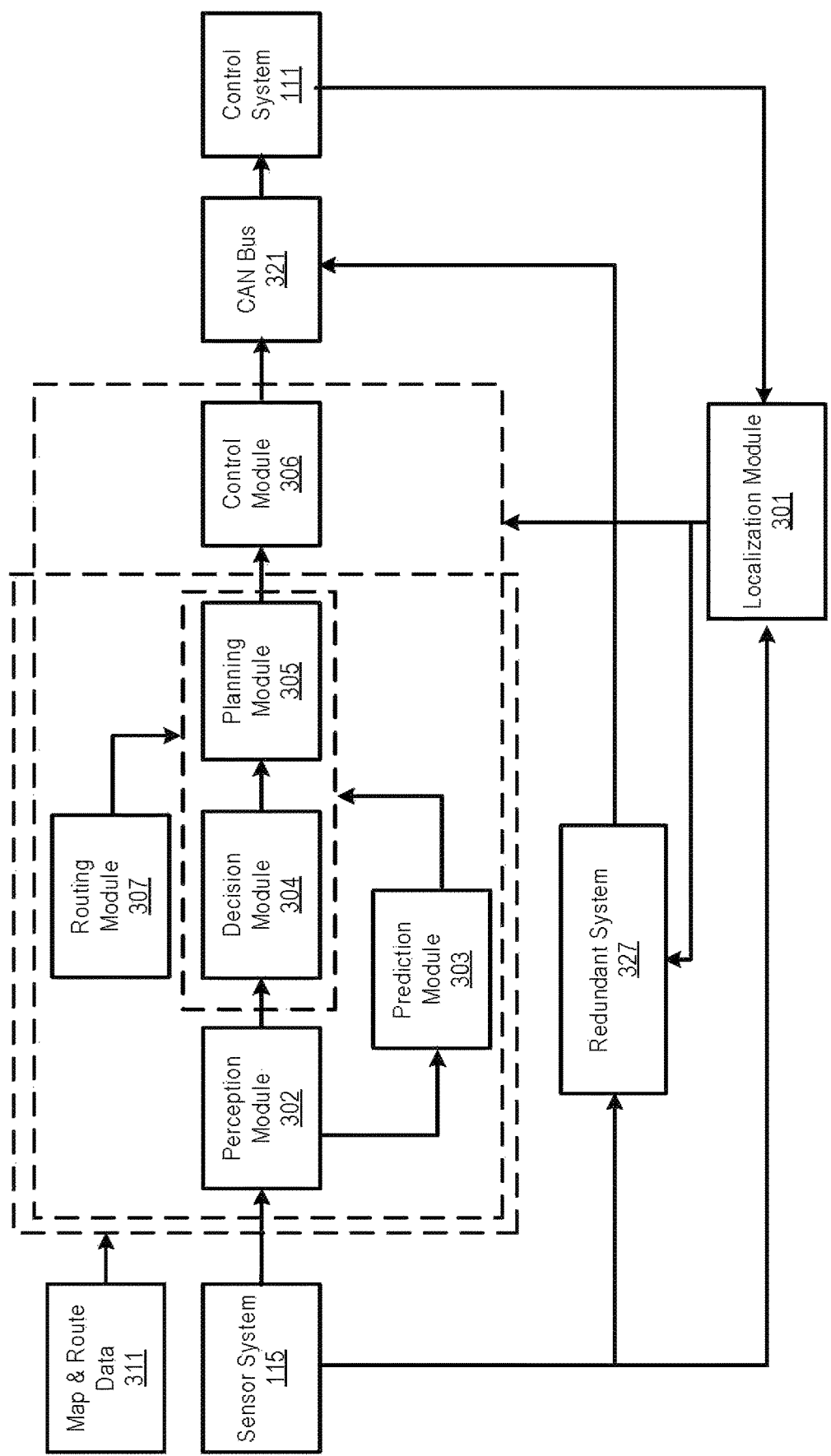

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of control system 111 of FIG. 2. Some of modules 301-307 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to control system 111 via a CAN bus 321, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

As shown in FIGS. 3A-3B, a redundant system 327 can be provided as a backup or secondary ADS. When the ADS 110 or another software/hardware component in the ADV 101 fails to function properly, the redundant system 327 may take over the control of the vehicle and transition the ADV 101 to a safer condition.

Each module in FIGS. 3A and 3B can be implemented in software or hardware or a combination therefore.

Fail-Safe System

Figure 4:
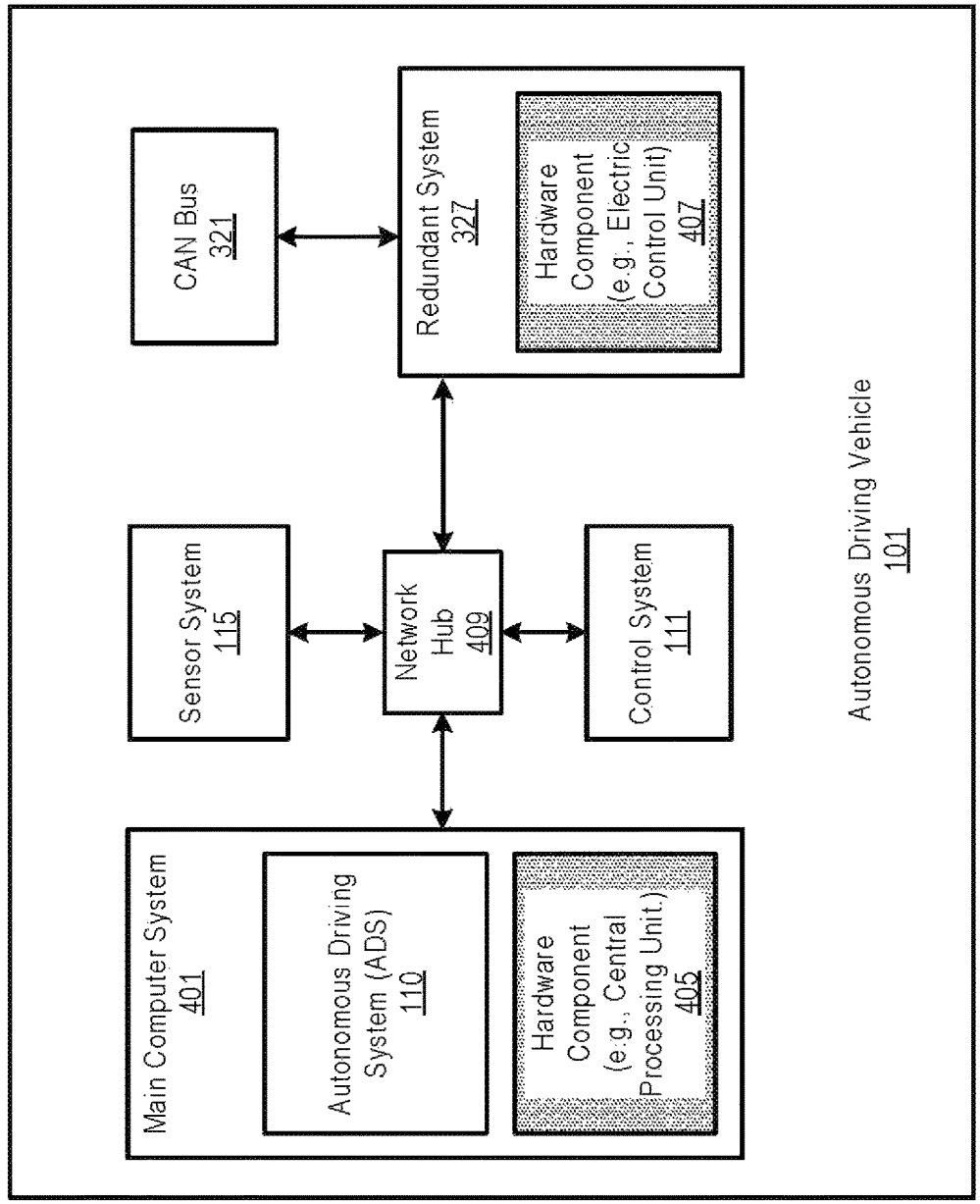
FIG. 4 is a block diagram illustrating an example of a fail-safe system in an ADV according to one embodiment.

FIG. 4 is a block diagram illustrating an example of a fail-safe system 400 in an ADV according to one embodiment. More specifically, the figure illustrates a software architecture and a hardware architecture of the fail-safe system 400. As shown in FIG. 4, the fail-safe system 400 can include the redundant system 327 that runs on a hardware component 407, which can be an industry standard electronic control unit (ECU). The hardware component 407 can be a piece of hardware that is separate from a hardware component 405 that runs the autonomous driving system (ADS) 110 in a main computer system 401. The two hardware components 405 and 407 can communicate with each other via a network hub 409, a local network, a message-based bus, or other forms of communication.

In one embodiment, the redundant system 327 can be a backup to the ADV 110. While the ADS 110 is configured to drive the vehicle in normal operations, the redundant system 327 operates in a standby mode and is configured to monitor output parameters of each module in the ADS 110. The redundant system 110 can also monitor output parameters of the sensor system 115, the control system 111, the CAN bus component 321, and the redundant system 327 itself. The output parameters of each software or hardware component to be monitored can be broadcast via the network to the redundant system 327, except that the redundant system 327 can directly communicate with the CAN bus component 321 without going through the network. The redundant system 327 can compare the output parameters with expected output parameters to determine whether a malfunction has occurred. In the event of a malfunction, the redundant system 327 can take appropriate actions based on a number of factors, including the frequency of the occurrence of the same malfunction, and its severity level.

Examples of the type of actions taken by the redundant system 327 include slow braking, and sudden braking. When the action is slow braking, the redundant system 327 may drive the ADV 101 slowly to the roadside and park it there to avoid blocking the traffic.

In one embodiment, the redundant system 327 can have autonomous driving functionality, which may include perception, planning, and control. The autonomous driving functionality in the redundant system 327 may be a backbone version of the autonomous driving functionality in the ADS 110.

In one embodiment, the redundant system 327 may have some basic autonomous driving functionality to drive the ADV 101 to a safer place, or perform emergency braking. For example, the redundant system 327 can simply rely on cameras to perceive the environment, and therefore does not need to perform sensor data fusion. Similarly, the redundant system 327 does not need to generate a reference line and perform optimization techniques to smooth the reference line.

Figure 5:
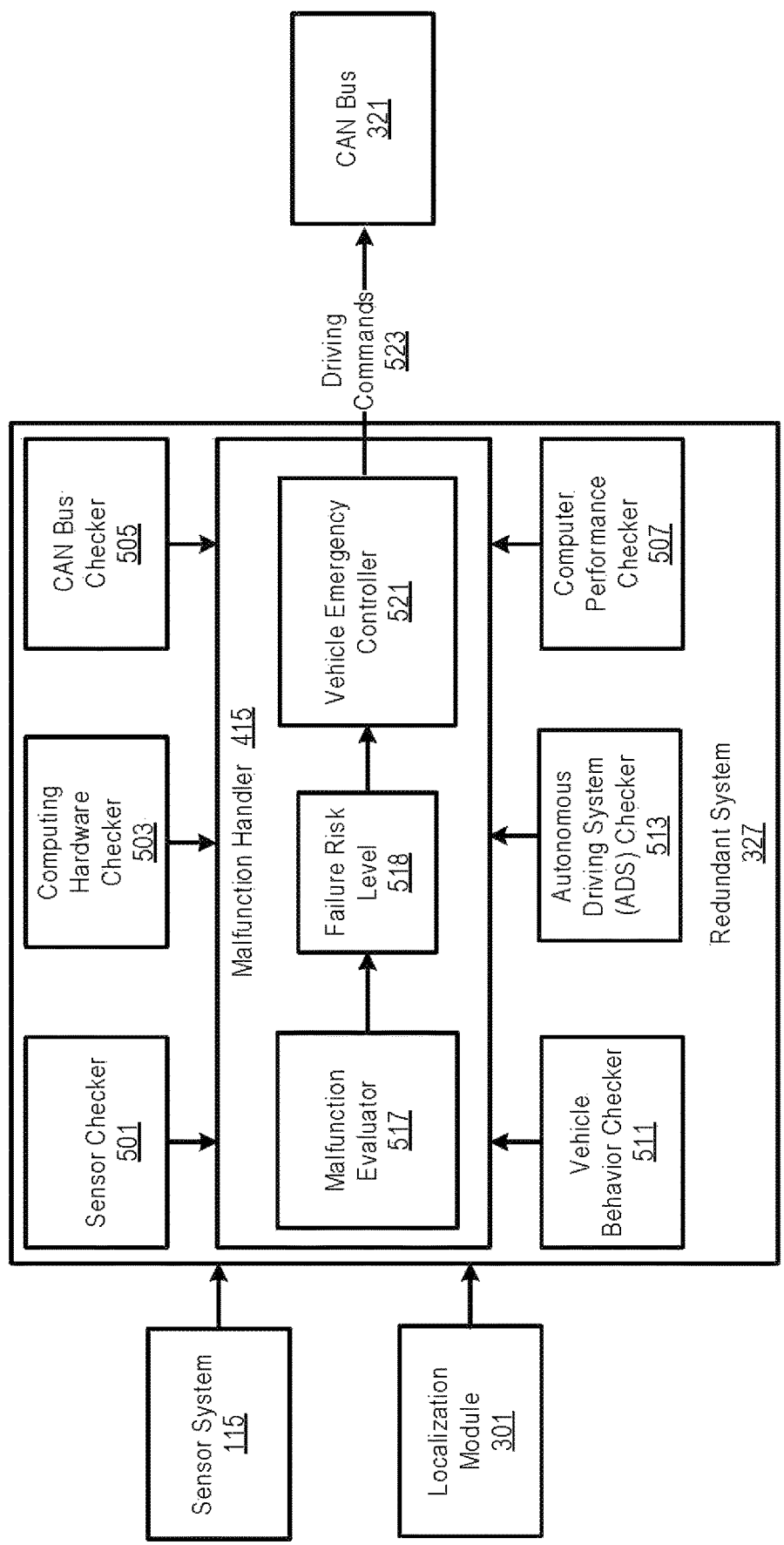
FIG. 5 is a block diagram further illustrating the fail-safe system of FIG. 4 according to one embodiment.

FIG. 5 is a block diagram further illustrating the fail-safe system of FIG. 4 according to one embodiment. As shown in FIG. 5, the redundant system 327 can include a number of checking to detect malfunctions in the ADV 101 based on output parameters from a number of hardware or software components. Each checking component can compare output parameters from a software or hardware component with their respective expected parameters. Based on the comparison, the checking component can detect the presence of any malfunction in the software or hardware component.

In this disclosure, an error, in one embodiment, a malfunction, and abnormality can be used interchangeably. Each term refers to a situation where the performance of a software or hardware component does not meet a predefined specification.

In one embodiment, the redundant system 327 can use a malfunction evaluator 517 to determine its level of failure risk 518 of a malfunction, namely how likely the malfunction may cause the ADV 101 to stop its normal operation.

In one embodiment, the malfunction evaluator 517 can use a predetermined algorithm to determine the level of failure risk 518 of a malfunction. The algorithm can examine a number of factors, which include a general category of a malfunction, a specific component where the malfunction occurs, a frequency of occurrence of the malfunction, and availability of inspection data for the malfunction.

In one embodiment, the general category of a malfunction refers to the general area where the malfunction occurs, for example, hardware, software, or vehicle behaviors. The hardware can include a hardware sensor, the hardware component 405 in the main computer system 401, and the hardware component 407 in the redundant system 327. The software can include the various modules in the ADS 110 and other software components in the ADV 101. The vehicle behaviors can include a number of abnormalities that occur while the vehicle is driving in an autonomous driving mode, for example, abnormal speed and acceleration, abnormal location, and vehicle door open while the vehicle is driving, etc.

The factor of the specific component refers to a particular component where the malfunction occurs. For example, the malfunction can occur in a LiDAR sensor, or in the perception module 302. The factor provides additional details to a malfunction. The frequency of occurrence of a malfunction refers to the number of times that a particular malfunction has occurred over a past period of time. The number can be maintained in a counter in the redundant system 327.

The availability of inspection data for a malfunction refers to whether sufficient information exists that can be used to further inspect the malfunction. For example, in the initialization stage of the ADV 101, if a malfunction occurs after the ADS 110 is powered on but before data flow has been generated for the malfunction, then there would be no data available for further inspection of the malfunction.

Each of the above factors can be given a weight in the predetermined algorithm used to a level of failure risk for a malfunction. The weight of each factor can be based on user experiences. The level of failure risk for a malfunction can be high, medium, or low. Each level of risk can be associated with a range of value. Using the algorithm, the malfunction evaluator 517 can calculate a risk value for a malfunction, and then classify the risk value into one of high, medium, or low.

Alternatively, the malfunction evaluator 517 can include a neural network model trained based on driving statistics collected from ADVs driven by human drivers, and labelled data. The trained neural network model can take information for a malfunction as input, and generate a level of risk failure for the malfunction. For example, information for a malfunction provided as input to the trained neural network can include the factors used by the predetermined algorithm described above.

In one embodiment, a high failure risk can cause a vehicle emergency controller 521 to perform an emergency braking on the vehicle, while a medium or a low failure risk will cause the vehicle emergency controller 521 to perform a slow braking on the braking.

In the slow braking mode, the ADV 101 can slowly drive to a safer place and park there. In this mode, the vehicle emergency handler 521 can use sensors data and localization information to generate a path to a nearby safe place, e.g., the curb of the road, and send driving commands 523 directly to the CAN bus component 321 without sending the driving commands 523 to the control module 306 as the ADS 110 would normally do.

In one embodiment, the vehicle emergency controller 521 do not use the functionality of the ADS 110 in performing autonomous driving operations. Instead, the vehicle emergency controller 321 can implement its own autonomous driving algorithm to perform basic functions based on sensor data and localization information. Such basic functions would be more reliable than the complex algorithms that the ADS 110 uses for autonomous driving operations. The simple and basic algorithm used by the vehicle emergency handler 421 can be easier to execute in real-time and less prone to errors, which can provide a reliable backup when a critical malfunction is detected that cause the ADS 110 to malfunction.

In one embodiment, the redundant system 327 can include a sensor checker 501 configured to check for malfunctions in sensors in the ADV 101. For example, the sensor checker 501 can check whether the output frequency of the data channel for a LiDAR sensor, an IMU, a monocular camera, or a millimeter wave radar is within a particular range for that type sensor. Each hardware sensor has a normal range for its data channel output frequency. If in real time, the data channel output frequency is outside the range, the sensor may experience a malfunction.

A CAN bus checker 505 can check whether the channel frequency for braking messages, driving messages and steering messages sent by the CAN bus 321 is within a particular range.

A computer hardware checker 503 can check for malfunctions in the main computer system 401, human machine interface (HMI) hardware, and the redundant system 327 based on the presence of heartbeat signals from each type of hardware component. For example, the computer hardware checker 503 can check whether the main computer system 401 has been powered on and is working normally, whether the HMI hardware output is normal, and whether the redundant system 327 has been powered on and is working normally.

In one embodiment, the redundant system 327 can also include a vehicle behavior checker 511 configured to check for any abnormality in the behaviors of the vehicle. The abnormal behaviors of the vehicle may include a vehicle door being open while the vehicle is in motion, a risk of collision with vehicles in an opposite adjacent lane, abnormal speed and acceleration, etc.

The ADS checker 513 can check for any malfunctions in the ADS 110. For the perception module 302 in the ADS 110, malfunctions may include abnormal output data channel frequencies, abnormal perception processing delay, and abnormal point cloud fusion. For the localization module 301, the prediction module 303, malfunctions can include abnormal output data channel frequencies. For the control module 306, malfunctions can include abnormal output data channel frequencies and abnormal total link delay timeouts. For the prediction module 303, malfunction may include abnormal total link delay timeouts.

Since the data channel frequency of the various sensors, the CAN bus 321, and the various modules in the ADS 110 are broadcast via the network, the redundant system 327 can use its respective checker to determine whether there is any abnormality in the frequencies.

In one embodiment, the redundant system 327 can include a computer performance checker 507 that is configured to check for any malfunctions in abnormal clock synchronization between the main computer system 401 and the redundant system 407 at the hardware level; abnormal CPU utilization, abnormal CPU temperature, abnormal memory utilization, insufficient disk space in the main computer system 401; and kernel log error in the redundant system 327.

Figure 6:
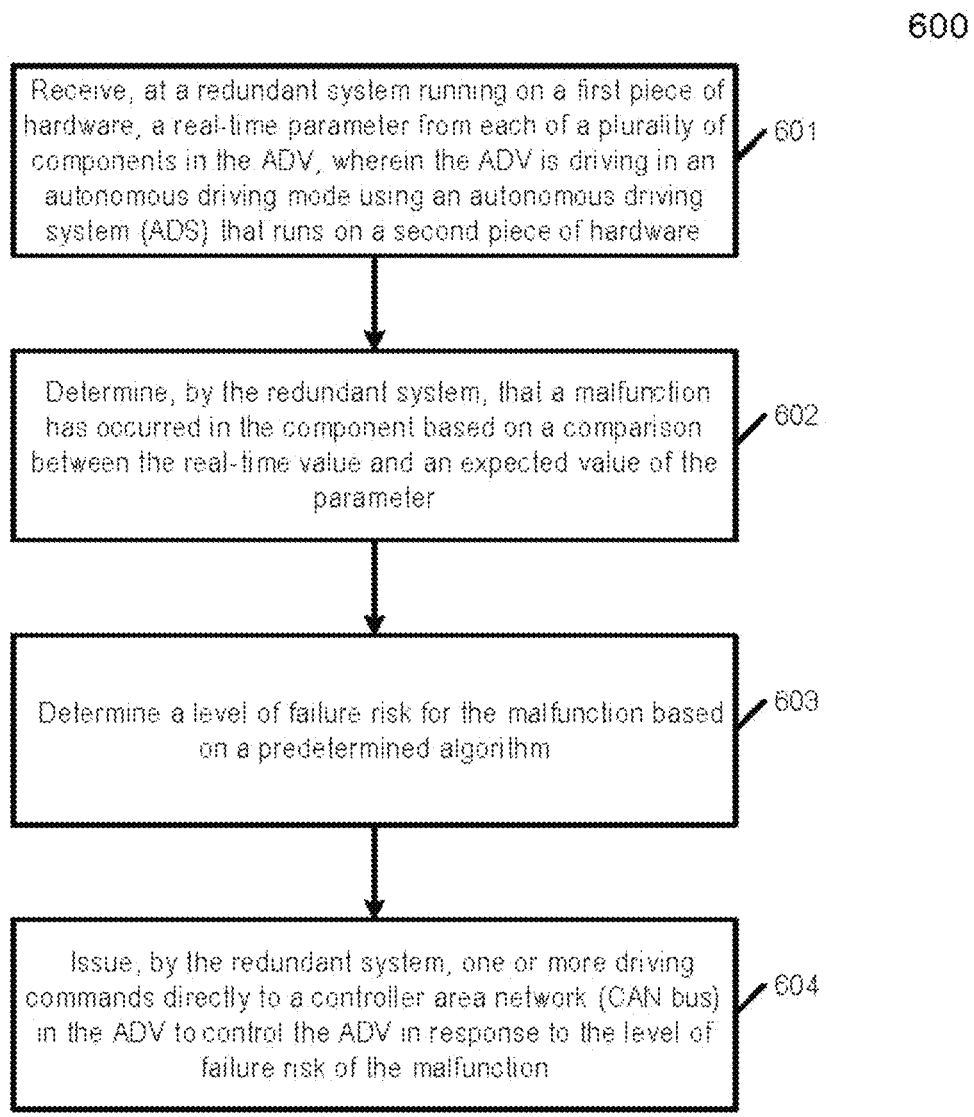
FIG. 6 is a block diagram further illustrating an example of a method for handling malfunctions in an ADV according to one embodiment.

FIG. 6 is a block diagram further illustrating an example of a method 600 for handling malfunctions in an ADV according to one embodiment. Process 600 may be performed by processing logic which may include software, hardware, or a combination thereof. For example, process 600 may be performed by the redundant system 327 as described in FIGS. 4-6.

Referring to FIG. 6, in operation 601, the processing logic running on a first piece of hardware receives a real-time parameter from each of a plurality of components in the ADV, which is driving in an autonomous driving mode using an autonomous driving system (ADS) that runs on a second piece of hardware. The first piece of hardware is an electronic control unit (ECU).

In operation 602, the processing logic determines that a malfunction has occurred in the component based on a comparison between the real-time value and an expected value of the parameter.

In operation 603, the processing logic determines a level of failure risk for the malfunction based on a predetermined algorithm.

In operation 604, the processing logic issues one or more driving commands directly to a controller area network (CAN bus) in the ADV to control the ADV in response to the level of failure risk of the malfunction.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of handling malfunctions in an autonomous driving vehicle (ADV), comprising:
   receiving, at a redundant system running on a first electronic control unit (ECU), a real-time value of each output parameter of each of a plurality of components in the ADV, wherein the plurality of components include a primary autonomous driving system (ADS) running on a second ECU, wherein the primary ADS is configured to generate planned trajectories based on localization data and sensor data from a global positioning system (GPS) system, one or more cameras, and one or more light detection and ranging (LiDAR) devices, smooth the planned trajectories, and issue first driving commands to a controller area network (CAN bus) to operate the ADV to follow the smoothed planned trajectories to operate the ADV;
   determining, by the redundant system, that a malfunction has occurred in a component of the plurality of components based on a comparison between the real-time value and an expected value of the output parameter of each of the plurality of components;
determining a level of failure risk for the malfunction that has occurred in the component based on a predetermined weight of each of a plurality of factors associated with the malfunction, wherein the plurality of factors include a general category of the malfunction, a specific component where the malfunction occurs, a frequency of occurrence of the malfunction, and availability of inspection data for the malfunction; and
in response to determining that the level of failure risk falls within a particular value range, driving, by the redundant system, the ADV using the redundant system, including generating a path to a closest safe place based on localization data and sensor data only from the one or more cameras and without smoothing the path, and issuing second driving commands the CAN bus to control the ADV in response to the closest safe place.

2. The method of claim 1, wherein the output parameter is one of an output data channel frequency, central process unit (CPU) utilization, memory utilization, disk space, a data processing delay, or a total link delay timeout.

3. The method of claim 1, wherein the level of failure risk of the malfunction is one of high, medium, or low.

4. The method of claim 1, wherein the redundant system uses sensor data and map data to locate the closest safe place.

5. The method of claim 1, wherein the plurality of components include one or more hardware sensors, the first ECU, the second ECU, and a plurality of autonomous driving modules in the primary ADS.

6. The method of claim 1, wherein the redundant system receives the real-time value of the output parameter of each of a plurality of components in the ADV via a network hub.

7. The method of claim 6, wherein the primary ADS issues the first driving commands to the CAN bus via the network hub.

8. The method of claim 6, wherein the redundant system issues the second driving commands directly to the CAN bus without going through the network hub.

9. A non-transitory machine-readable medium storing a redundant system program running on a first electronic control unit (ECU) for handling malfunctions in an autonomous driving vehicle (ADV), wherein the redundant system program, when executed by the first ECU, cause the redundant system program to perform operations, the operations comprising:
receiving a real-time value of each output parameter of each of a plurality of components in the ADV, wherein the plurality of components include a primary autonomous driving system (ADS) running on a second ECU, wherein the primary ADS is configured to generate planned trajectories based on localization data and sensor data from a global positioning system (GPS) system, one or more cameras, and one or more light detection and ranging (LiDAR) devices, smooth the planned trajectories, and issue first driving commands to a controller area network (CAN bus) to operate the ADV to follow the smoothed planned trajectories to operate the ADV;
determining that a malfunction has occurred in a component of the plurality of components based on a comparison between the real-time value and an expected value of the output parameter of each of the plurality of components;
determining a level of failure risk for the malfunction that has occurred in the component based on a predetermined weight of each of a plurality of factors associated with the malfunction, wherein the plurality of factors include a general category of the malfunction, a specific component where the malfunction occurs, a frequency of occurrence of the malfunction, and availability of inspection data for the malfunction; and
in response to determining that the level of failure risk falls within a particular value range, driving, by the redundant system, the ADV using the redundant system, including generating a path to a closest safe place based on localization data and sensor data only from the one or more cameras and without smoothing the path, and issuing second driving commands the CAN bus to control the ADV in response to the closest safe place.

10. The non-transitory machine-readable medium of claim 9, wherein the parameter is one of an output data channel frequency, central process unit (CPU) utilization, memory utilization, disk space, a data processing delay, or a total link delay timeout.

11. The non-transitory machine-readable medium of claim 9, wherein the redundant system receives the real-time value of the output parameter of each of a plurality of components in the ADV via a network hub.

12. The non-transitory machine-readable medium of claim 11, wherein the primary ADS issues the first driving commands to the CAN bus via the network hub.

13. The non-transitory machine-readable medium of claim 11, wherein the redundant system issues the second driving commands directly to the CAN bus without going through the network hub.

14. A data processing system for handling malfunctions in an autonomous driving vehicle (ADV), comprising:
a first electronic control unit (ECU) with a redundant system running thereon;
a second ECU with a primary ADS running thereon, wherein each of the primary ADS is configured to generate planned trajectories based on localization data and sensor data from a global positioning system (GPS) system, one or more cameras, and one or more light detection and ranging (LiDAR) devices, smooth the planned trajectories, and issue first driving commands to a controller area network (CAN bus) to operate the ADV to follow the smoothed planned trajectories; and
a memory coupled to the first ECU and store program instructions, wherein the program instructions, when executed by the first ECU, cause the redundant system to perform operations, the operations comprising:
receiving a real-time value of each output parameter of each of a plurality of components in the ADV, wherein the ADV is driving in an autonomous driving mode using the primary ADS,
determining that a malfunction has occurred in a component of the plurality of components based on a comparison between the real-time value and an expected value of the output parameter for each of the plurality of components,
determining a level of failure risk for the malfunction that has occurred in the component based on a predetermined weight of each of a plurality of factors associated with the malfunction, wherein the plurality of factors include a general category of the malfunction, a specific component where the malfunction occurs, a frequency of occurrence of the malfunction, and availability of inspection data for the malfunction, and in response to determining that the level of failure risk falls within a particular value range, driving the ADV using the redundant system, including generating a path to a closest safe place based on localization data and sensor data only from the one or more cameras and without smoothing the path, and issuing second driving commands the CAN bus to control the ADV in response to the closest safe place.

15. The data processing system of claim 14, wherein the parameter is one of an output data channel frequency, central process unit (CPU) utilization, memory utilization, disk space, a data processing delay, or a total link delay timeout.

16. The data processing system of claim 14, wherein the redundant system uses sensor data and map data to locate the closest safe place.

17. The data processing system of claim 14, wherein the plurality of components include one or more hardware sensors, the first ECU, the second ECU, and a plurality of autonomous driving modules in the primary ADS.

18. The data processing system of claim 14, wherein the redundant system receives the real-time value of the output parameter of each of a plurality of components in the ADV via a network hub.

19. The data processing system of claim 18, wherein the primary ADS issues the first driving commands to the CAN bus via the network hub.

20. The data processing system of claim 18, wherein the redundant system issues the second driving commands directly to the CAN bus without going through the network hub.

* * * * *